United States Patent Office.

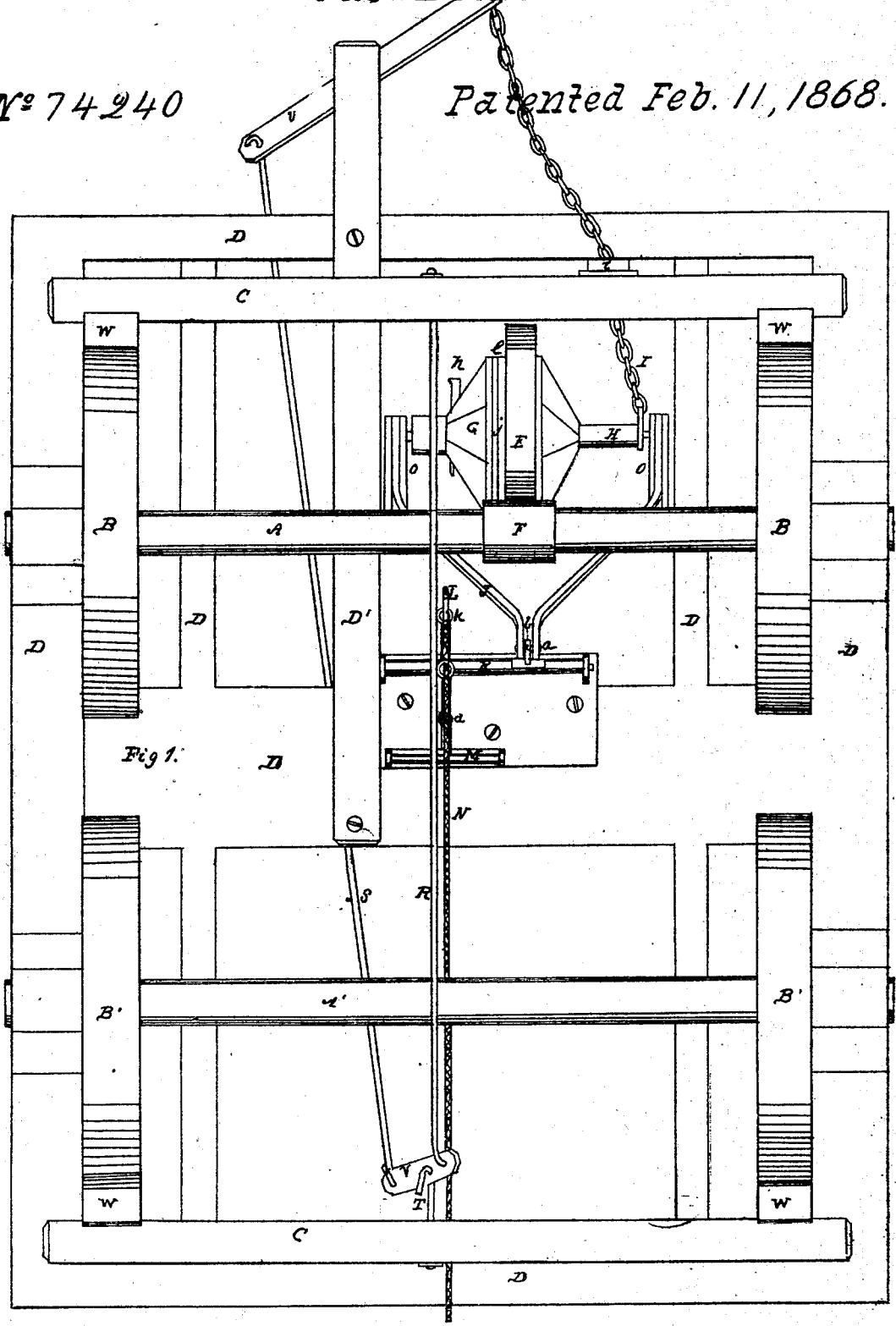

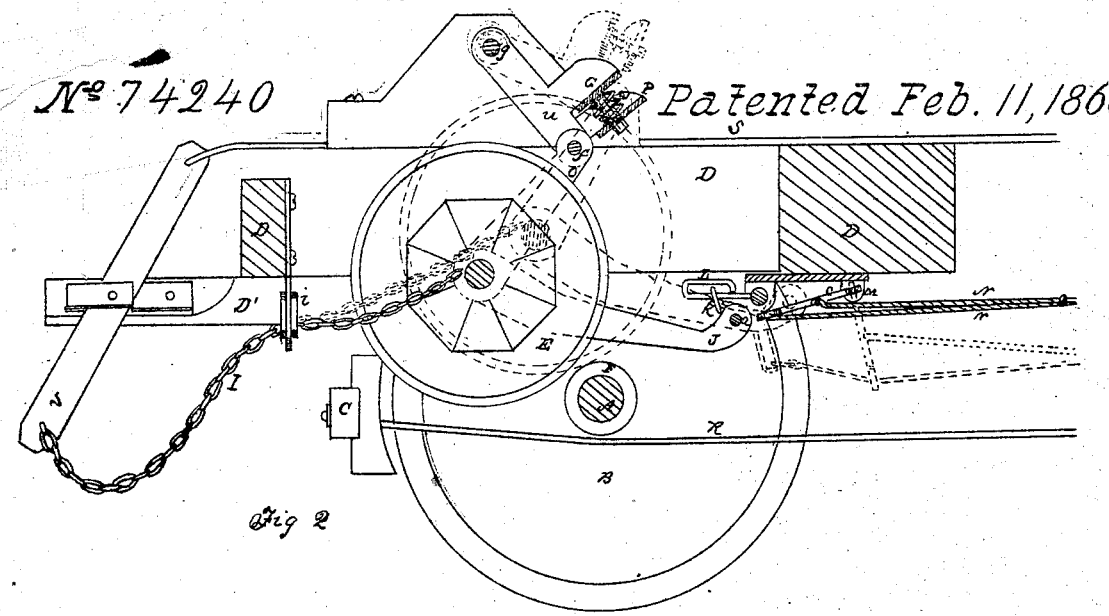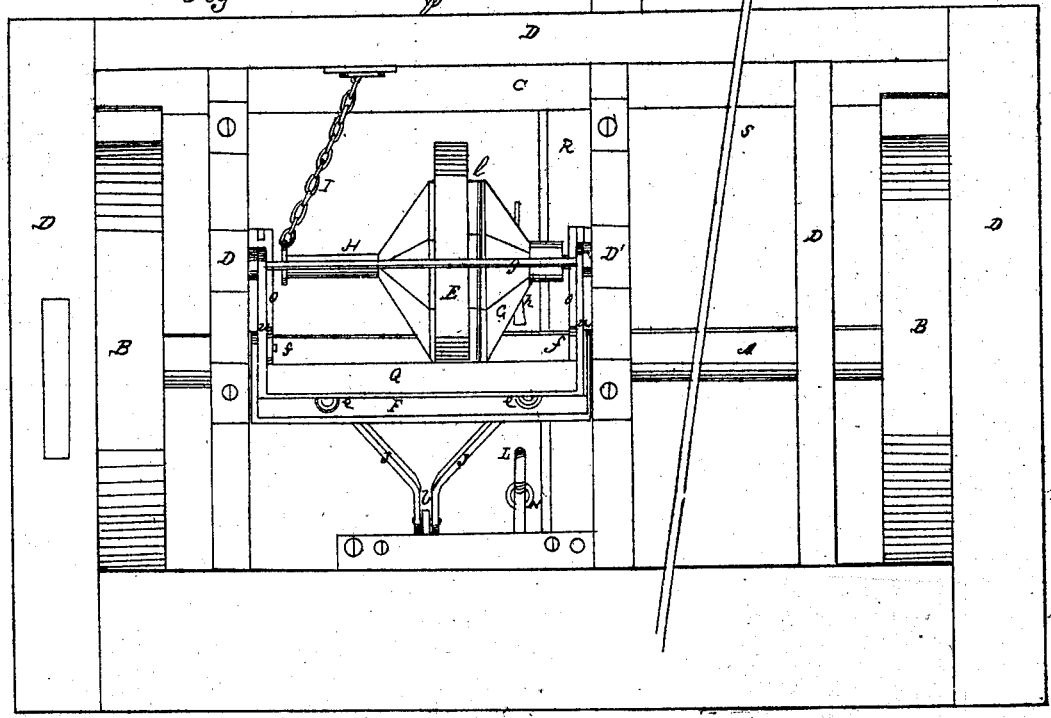

JOSEPH H. MOORE AND JOSEPH E. GARY, OF CHICAGO, ILLINOIS.

Letters Patent No. 74,240, dated February 11, 1868.

IMPROVED CAR-BRAKE.

*The Schedule referred to in these Letters Patent and making part of the same.*

TO ALL WHOM IT MAY CONCERN:

Be it known that we, JOSEPH H. MOORE and JOSEPH E. GARY, of the city of Chicago, Cook county, State of Illinois, have invented certain new and useful Improvements in Railway-Car Brakes; and we do hereby declare that the following is a full, clear, and exact description of the same, reference being had to the accompanying drawings, making a part of this specification, in which—

Figure 1 represents a bottom view of our truck having the brakes attacked.

Figure 2, sheet 2, is a vertical longitudinal section through the pair of wheels and axle, to which the improvements are attached.

Figure 3, a top or plan view of one-half of the truck.

Like letters refer to the same parts in all the figures.

The nature and object of our invention consist in so applying friction-wheels or rollers to the truck that the power to operate the brakes shall be taken from the axle of the wheels to which the brakes are applied; in so arranging or adjusting the chain at such an angle with certain parts of the apparatus, as hereinafter set forth, that the strain upon the chain when applying the brakes shall increase the pressure of the friction-wheel upon the axle to the degree required to produce the power requisite to set the brakes, as desired; in the application of a rock-shaft to a car-truck; in providing such rock-shaft with a slotted or variable arm; in attaching or connecting to such rock-shaft the bars by which the friction-wheel is moved, so that when the friction-wheel is brought to bear upon the axle or axle-wheel, such friction-wheel can be held in place by the application of a slight force or power; in providing a pushing-arm or prop, in connection with the slotted or variable arm of the rock-shaft, to move the operating-cord upon the variable arm of the rock-shaft, and thereby increase the power of the lever or variable arm without materially increasing the length of the operating-cord; in a novel application of the operating-cord; in providing the friction-wheel with a friction-clutch, so that the power of the friction-wheel can be adjusted to the strength of the material, and also so that the power applied to the brake or upon the wheels can be adjusted; in providing the arms which support the axle of the friction-wheel with joints, so as to avoid rigidity, and also adjust the friction-wheel to the forward or backward movement of the truck; and in the several combinations hereinafter set forth and claimed.

It is designed to have this apparatus attached to one truck of each car, with which to operate all the brakes on such car, but it can be readily attached to each truck, and it may be readily connected with such system or arrangement of brake-levers as may be most convenient, or such as may be found upon the cars to which it is applied, and operated by means of the bell-cord, or of a separate cord extending through the train in any location, so that all of the brakes in the train can be simultaneously operated by one or more persons, and by a slight force, without the use of springs or other means for obtaining a reserved force, and without any device for disposing of the slack of the chains or cords, whether few or many cars be used.

To enable others skilled in the art to make and use our improved brake, we will describe its construction and operation.

The wheels B B', axles A A', and frame D, composing the main portion of the truck, also the beams $c$, rubbers $w$, levers $v$, and rods R and S, are made in any known form, no special construction of these parts being necessary to the use of our improvements. As it is not desirable to make our apparatus the full width of the truck, (which, however, can be done,) we usually add an additional beam, D', to the truck, and upon this beam and one of the main beams place an elevated piece, as shown in fig. 2. To these elevated pieces, or to such other parts as may be convenient, we attach the jointed arms $u$ $o$, as shown in figs. 2 and 3. These arms are attached to the truck by the rod or joint $g$, and are jointed together at $f$, and the lower ends of the parts $o$ form the journal-bearings of the shaft H. The upper parts of the arms $u$ are provided with a cross-bar, Q, which extends across from one to the other, and the lower parts, $o$, are extended beyond the joint $f$, and provided with a similar cross-bar, P. Between these two cross-bars, springs $e$ are placed for the purpose of returning the arm to its natural position. These arms are made in two pieces, or jointed so as to allow the friction-wheel a free operation while changing its position, and because it is necessary to provide for a change in the direction of the car; for when the car is running so that the wheels of the truck come upon the brake-shoes from above, the tendency is to compress the car-springs, and diminish the distance between the top of the truck and axle of the wheels, and when the motion of the car is reversed, the tendency is the reverse of that stated; hence some means of flexibility in the hanging of shaft H is necessary to insure the perfect operation of the friction-wheel. Other forms of joint may be used, and the required flexibility may be secured by means of slots and springs, without any joints, and also by making only one end of shaft H flexible in its hangings or supports. A small friction-wheel, F, is attached to the axle A, to prevent wearing the axle, and a larger one, E, to to the shaft H. (The drawings are on a scale of one to eight.) The friction-wheel E is loosely attached to the shaft H, and revolves the shaft by means of a friction-clutch, G, which is made to bear against the side of the wheel E by means of a key, h, or other suitable device, and may bear directly against the wheel, or a separate piece, j, may be interposed, and replaced when worn. This piece is supported against the clutch by a cushion or spring, l. The chain I, by which the brake-levers are operated, is attached to the shaft H. The arms J are also attached to the shaft H, at the journals, or to the supporting-arms, near the journals, and carried to a rock-shaft, K, and pivoted at a to a short arm, b, attached to the rock-shaft. These arms may be bent just back of the pivot a, as shown in fig. 2, so that when the rock-shaft is turned, and the friction-wheels E F brought in contact, the line of force or draught will be as nearly through the centre of the rock-shaft as is practicable to permit of the automatic return of the arms J and wheel E. By this arrangement, when the shaft K is turned the friction-wheels are held in contact with little power.

We place the arms J as nearly horizontal as the structure of the truck-frame will permit, so that the wheel E may be brought into contact with the wheel F by the use of the least practicable force; and the chain I is extended from the shaft H to the brake-lever in a line forming such an angle with a line produced between the centres of the shaft H and axle A, when the wheels E and F are held in contact, that the strain upon the chain I, in winding the same on the shaft H to set the brakes, operating to increase that angle, increases the pressure of the wheels E and F upon each other, until the wheel E ceases to revolve the shaft H, by slipping in the friction-clutch, hereinafter described. This angle may be about ninety degrees, and may be larger or smaller, according to circumstances. The direction of the chain is such that when the cord N is relaxed the strain on the chain I will return the wheel E and the rock-shaft K to their positions at rest. When the brake-lever is set at an angle, as shown, or is vertical, the chain will have the proper direction. When necessary, a roller or guide, i, is attached to the truck, to produce the angle. The rock-shaft K is provided with a slotted or sliding arm, L, attached at or nearly at a right angle with the short arm b, so that when at rest it inclines towards the shaft H, and the slide or ring k of the cord N will be at the point of the slot in the arm or lever L nearest to the rock-shaft K. The length of the slotted or variable arm L on the rock-shaft K, and the length of the slot in the arm, depend on the force required to bring and hold the wheel E in contact with the wheel F; and this arm L should be so attached to the rock-shaft that when the friction-wheels are in contact it will stand or hang at a right angle with the cord N. Near this lever we attach to the truck a pushing-arm or prop, c, (through the end of which the cord N passes,) operated by a short cord, N', fig. 2, attached to the prop at d, and also to the main cord N, so that when the rock-shaft commences to turn, the pushing-arm or prop will commence to slide the cord N towards the outer end of the lever L, and gradually increase the leverage without increasing the travel of the cord N longitudinally, so that this apparatus can be operated on a large number of cars without materially increasing the "slack" of the cord. The slot in the arm L, the arm c, the ring k, and the cord N', are none of them essential parts of our improvements, but are used only for the purpose of diminishing the quantity of motion of the operating-cord. The cord N extends from the arm L to some convenient point for reaching the bell-cord or other operating-cord, and is there provided with a sheave, through which the operating-cord passes, in a bight or loop, so arranged that the rock-shaft will be turned by pulling the operating-cord in either direction.

We do not confine ourselves to the device described for operating our apparatus, as it is evident that a cam or other device may be effectively used.

In operation, the engineer, or any one or more persons anywhere on the train, by pulling the operating-cord, will shorten the bight or loop therein, and pull the cord N, thereby turning the rock-shaft K, and bringing the arm c to a position which slides the cord N to the outer end of L. The turning of the shaft K turns the short arm b forward, which brings the arms J forward, and the friction-wheels in contact. The chain I then commences to wind on the shaft H, and as soon as the brakes begin to press upon the wheels, the pressure of the friction-wheel E upon wheel F will increased, in consequence of the angle at which the chain is placed, as described, and the greater the pressure on wheels B, the greater will be the pressure of E upon F.

To prevent breaking any part, the pressure of the friction-clutch G is so adjusted that when the required pressure is produced the wheel E will revolve on the shaft H and against the clutch, without winding the chain on the shaft, and the required pressure can be continued for any length of time, and vibrations will be adjusted by the jointed arms o u. When the cord N is released, the reaction and the action of the springs e of the arms o u will return all the parts to their original positions, and all will be at once ready to be again used.

We thus provide a simple and effective mechanism for operating car-brakes, which is certain in operation, effective in action, easily attached to any car, not liable to get out of repair, and always in readiness for use.

Having thus fully described our invention, what we claim as new, and desire to secure by Letters Patent, is—

1. The combination of the chain I, wheel E, and shaft H, with the jointed arms u o, and with an arm or arms J, all operating substantially in the manner and for the purposes specified.

2. The combination of the cord N with the rock-shaft K, with its arms L and b, and the arms J, operating substantially in the manner and for the purposes specified.

3. The combination of the cord N' and prop C with the cord N and arm L, operating substantially in the manner and for the purposes specified.

JOS. H. MOORE,
JOSEPH E. GARY.

Witnesses:
L. L. BOND,
E. A. WEST.